INVENTOR
JAMES M. CONSTABLE
BY
ATTORNEYS

March 10, 1970   J. M. CONSTABLE   3,500,197
INTEGRATED HIGH VOLTAGE TRANSFORMER AND CAPACITOR DIVIDER
Filed April 29, 1968   2 Sheets-Sheet 2

INVENTOR
JAMES M. CONSTABLE
BY
ATTORNEYS

United States Patent Office 3,500,197
Patented Mar. 10, 1970

3,500,197
INTEGRATED HIGH VOLTAGE TRANSFORMER AND CAPACITOR DIVIDER
James M. Constable, Flushing, N.Y., assignor to Del Electronics Corporation, Mount Vernon, N.Y., a corporation of New York
Filed Apr. 29, 1968, Ser. No. 725,070
Int. Cl. G01r 19/00; H01f 27/36
U.S. Cl. 324—127                          12 Claims

ABSTRACT OF THE DISCLOSURE

A first corona shield is disposed on and insulated from the core of a high voltage transformer, thereby to form a first capacitance with another corona shield arranged about the secondary winding and to form a second capacitance with the transformer core, these capacitances being connected in series to define a capacitive voltage divider, an external meter being connected across said second capacitor so as to measure a predetermined portion of the transformer output voltage.

---

Figure 1:
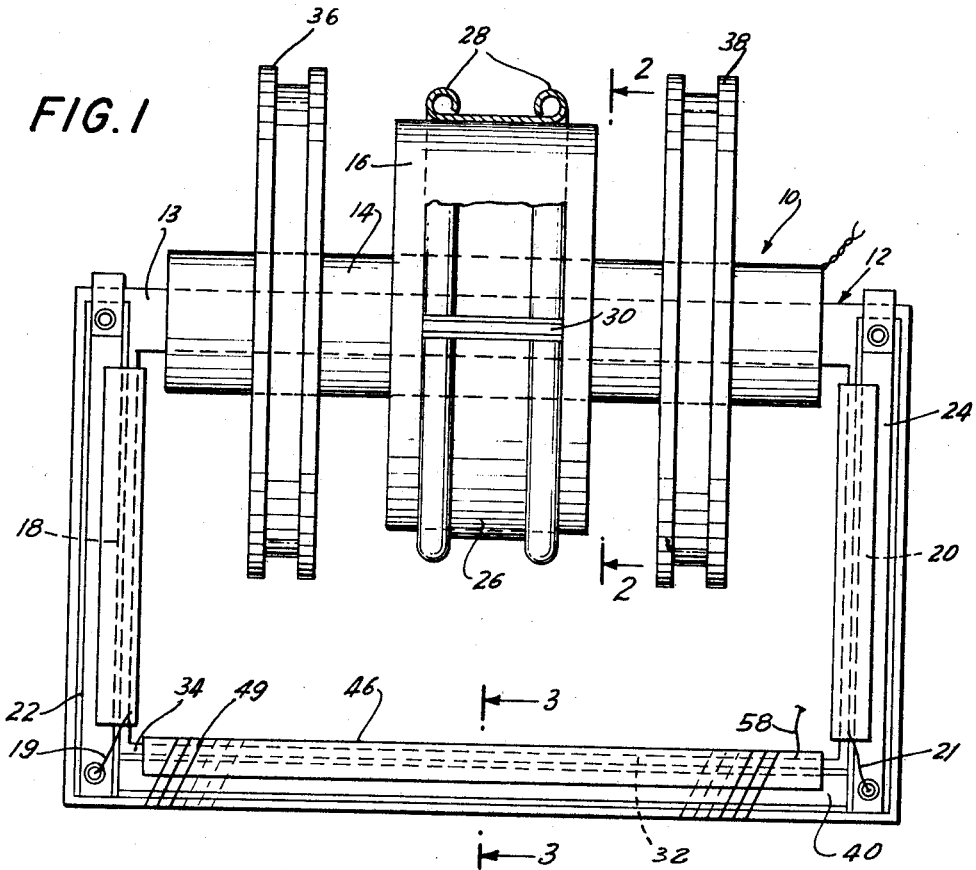

The present invention relates to a high voltage transformer measuring system, and particularly to an output voltage divider circuit physically incorporated into a high voltage transformer structure to facilitate the measuring of the secondary winding output voltage of the transformer.

It is often desirable to provide an accurate indication of the output voltage produced at the secondary or output winding of a high voltage transformer. Since the level of the voltage produced at the output windings of such transformers is very high (on the order of 225 kv.), means must be provided to accurately reduce the output voltage actually applied to the measuring circuit if standard voltage measuring devices are to be used.

Various ways have been proposed to accomplish this end, but they are all expensive and many are inaccurate. Thus in one known arrangement a tertiary winding is provided having a lower number of windings than the secondary winding, said tertiary winding being connected to an appropriate meter to provide an indication of the high voltage output at the secondary winding. The reading obtained in this manner is often in substantial error when there is appreciable loading on the secondary winding, and the provision of the additional tertiary winding increases the size, cost and complexity of the transformer construction.

It has also been proposed to connect a resistance voltage divider across the secondary winding to ground to provide a reduced known portion of the output voltage which can then be suitably measured on a conventional meter. Due to the extremely high voltages at which the secondary winding is operated, the dimensions of the resistors utilized in this voltage divider are, of necessity, comparatively large; and as a result, an effective capacitance is created to the body of the resistor itself, causing a capacitive coupling of current from the secondary winding to the middle section of the resistor body. The magnitude of this capacitively coupled current is particularly significant in that one of the resistors is connected directly to ground. These capacitive currents flowing in the voltage divider resistors are not predictable and produce voltage drops in the resistors which are not applied to the meter circuit. As a result, significant errors are introduced in the reading developed at the external voltmeter. In addition, the inherent physical capacitances of the large resistors create a capacitive A.C. conductance path to ground in the nature of a by-pass, which further adversely affects the accuracy of output voltage measurement.

To overcome the problems caused by the use of large resistor voltage dividers, it has been proposed to utilize a high voltage capacitor voltage divider connected between the secondary winding circuit and the external meter circuit. Due to the high voltages developed at the secondary winding, the physical size of the capacitors utilized in a divider of this type must be quite large in order to prevent breakdown of the capacitor dielectric, while at the same time providing the required capacitance. Moreover, the connecting leads of these capacitors introduce problems of corona discharge. Accordingly, the use of conventional capacitor voltage dividers not only presents electrical problems, but also requires the use of costly and bulky elements, thus greatly increasing the size of the transformer unit.

The problem of corona discharge is present in substantially all high voltage transformers as a result of the development of high potentials at sharp surfaces. As a result, transformers of this type are commonly provided with corona shielding which effectively eliminates corona discharge surfaces and greatly minimizes the amount of corona discharge. In a typical high voltage transformer construction, the corona shielding comprises a first section arranged about the transformer windings, and a second section provided on the laminated core of the transformer on which the windings are arranged, the second section being conventionally connected to ground. When capacitor voltage dividers are used, an appreciable amount of output current leaks to ground through the capacitance between the corona shields, thus further reducing the accuracy of the meter reading.

It is thus a general object of the present invention to provide a high voltage transformer output measuring system, in which an accurate, reduced portion of the secondary output signal is developed, and to provide a voltage divider for use in such a system.

It is a further object of the present invention to provide a voltage divider for use in developing a reduced portion of the output voltage and to provide a measuring system using such a divider, which does away with the need for bulky circuit elements and therefore reduces the size of the transformer and substantially reduces the errors introduced by the use of such bulky elements.

It is another object of the present invention to provide a voltage divider for use in coupling a high voltage secondary winding to a measuring circuit in which the elements forming the voltage divider are those commonly provided on the transformer.

It is a still further object of the present invention to provide a high voltage transformer in which the means connecting the transformer output winding to a measuring circuit requires a minimum alteration of the transformer construction and yet produces an exceptionally accurate indication of the transformer output voltage.

It is yet another object of the present invention to provide a high voltage transformer in which existing elements of the transformer are utilized to provide a voltage divider required for coupling a portion of the secondary winding voltage to the measuring circuit.

It is a more specific object of the present invention to provide a high voltage transformer voltage divider in which a relatively simple and inexpensive modification is made to the existing corona shielding structure in the transformer to form the elements of a capacitive voltage divider which couples a reduced, accurately determined portion of the secondary winding voltage to an external measuring circuit.

It is a further object of this invention to form the branches of a capacitive voltage divider from the elements of a corona shield of the type conventionally provided in high voltage transformers, the capacitive voltage divider so formed coupling an accurately predetermined portion of the transformer output voltage to an external meter to produce a measuring system.

In accordance with the present invention, one of the corona shields is maintained electrically insulated from the transformer core and from ground so as to produce a first effective capacitance between it and an adjacent shield on the secondary winding, and a second effective capacitance between it and ground, the two capacitances being series-connected to form the arms of a capacitive voltage divider which couples an accurately predetermined portion of the output secondary voltage to an external conventional metering circuit, the meter providing a ground return for the insulated shield. Thus, the elements of the capacitive voltage divider are formed from elements (i.e. the corona shields) which are conventionally provided in a high voltage transformer of this type, only a relatively slight and inexpensive structural modification being required to produce the capacitive voltage divider of the present invention.

Figure 2:
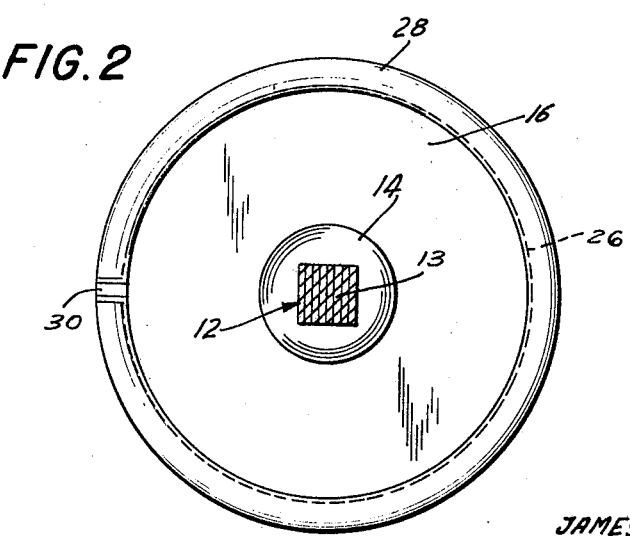
Figure 3:
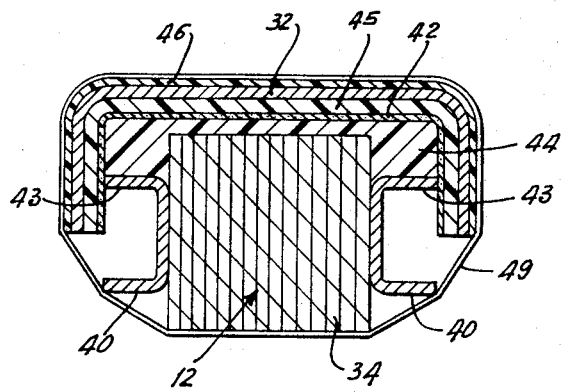
Figure 4:
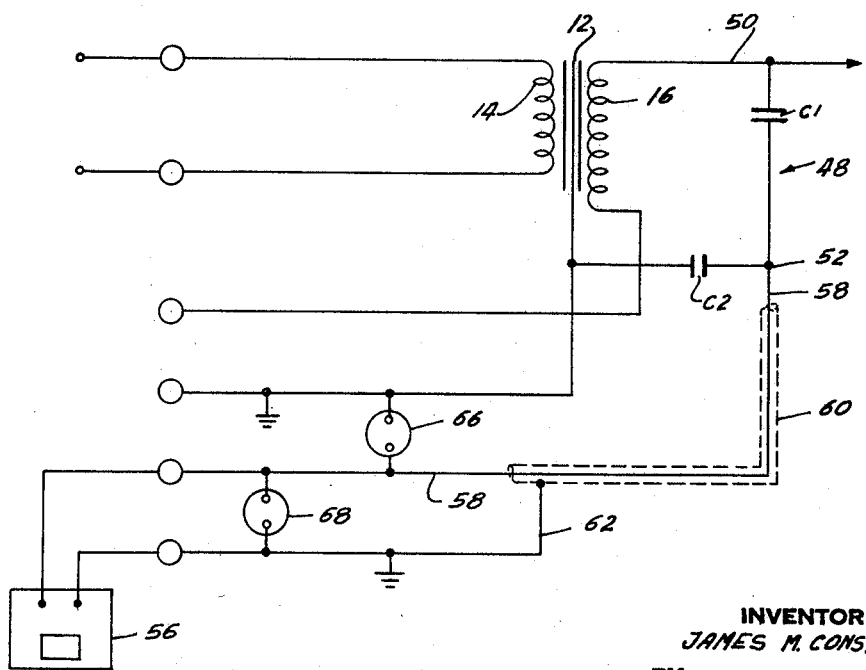

To the accomplishment of the above, and to such other objects as may hereinafter appear, the present invention relates to the construction of a high voltage transformer capacitive voltage divider and to the arrangement of a measuring system utilizing such a divider, as defined in the appended claims and as described in this specification, taken together with the accompanying drawings in which:

FIG. 1 is an elevation, partially broken away, illustrating a high voltage transformer incorporating the present invention;

FIGS. 2 and 3 are cross-sectional views taken along the lines 2—2 and 3—3, respectively, of FIG. 1; and FIG. 4 is a schematic diagram of a measuring circuit connected to the secondary winding of the high voltage transformer of FIG. 1 and utilizing the capacitive voltage divider of FIGS. 1–3.

A high voltage transformer, generally designated 10, comprises a laminated ferro-magnetic core 12, here shown in substantially rectangular form. A primary winding 14 and a secondary winding 16 are concentrically arranged about the upper transverse leg portion 13 of the core 12 in inductively coupled relationship with one another. A suitable insulating layer is arranged about each of windings 14 and 16 to insulate these windings from one another. In an exemplary embodiment of a high voltage transformer, the 240 v, 10 amps 60 cycle alternating voltage applied to the primary winding 14 is increased to a level of 225 kv. at 10 ma. at the secondary winding 16. At this elevated potential at secondary winding 16, there is a significant chance of corona discharge between adjacent sharp or pointed high potential surfaces, the occurrence of which is wasteful of electrical energy, and thereby substantially reduces the operating efficiency of the transformer. To prevent such corona discharge, suitable corona shielding is normally arranged about most of the surfaces of the transformer to eliminate the sharp discharge surfaces of the transformer.

In the operation of transformers of this type, it is often important that an indication of the secondary voltage be readily available. An external voltmeter measuring circuit is placed in circuit with the secondary winding for this purpose. As the secondary winding voltage is at a relatively high potential, means must be provided between the secondary winding and the external voltmeter to produce an accurately predetermined fraction of the secondary or output voltage which can be readily measured on a conventional voltmeter. In accordance with the present invention, the arrangement of the already existing corona shielding is modified to provide a pair of capacitances which are arranged to form the two arms of a capacitive voltage divider in circuit connection with the secondary winding, the output of which is at a properly and accurately reduced voltage level which can be conveniently measured on a conventional voltmeter.

In the illustrated embodiment of this invention, the corona shielding comprises corona shields 18 and 20 arranged respectively about opposing vertical leg portions 22 and 24 of the transformer core 12, and a cylindrical corona shield 26 disposed about the periphery of secondary winding 16. Shield 26 has a pair of circumferential tubular members 28 arranged about either edge thereof so as not to provide a sharp surface along its circumferential edges and has an insulating strip 30 provided between the transverse ends thereof. An additional corona shield 32 is arranged about the lower, transverse leg portion 34 of core 12 and is spaced from corona shield 26. If desired, additional corona preventing means, such as the spaced Lucite insulating rings 36 and 38, may be arranged around the primary winding 14. The corona shields 18, 20 and 32 are each in the form of a thin, curved strip of metal, such as copper, having no sharp discharging surfaces. Corona shields 18 and 20 are electrically connected to the grounded core 12, and thus to ground, by means of wires 19 and 21 respectively. Significantly, no such connection is made between corona shield 32 and the core 12. If corona shields 18 and 20 were in electrical contact with legs 22 and 24, respectively, along their entire lengths, they would each then constitute a short circuited, single turn winding. To avoid this, the electrical connection between the shields 18 and 20 and core 12 is made only by means of the wires 19 and 21.

Referring to FIG. 3, the arrangement of the corona shield 32 with respect to the transverse leg portion 34 of core 12 is shown for purposes of illustration as comprising a pair of opposed U-shaped brackets 40 secured in a known manner, such as brazing, welding, or soldering, to the opposing longitudinal surfaces of the leg portion 34. A thin piece of insulating press board 42 is arranged about the inner legs 43 of brackets 40, and the space between the press board 42, the brackets 40 and the core 12 is filled with epoxy 44. A second epoxy layer 45 is formed over the press board 42 and serves as an adhesive to secure the corona shield 32 to the core. A flexible, thin insulating protective polythene sheet 46 is then placed about shield 32 and secured thereto by a nylon twine 49 wrapped about the shield 32 and leg 34. The construction of the opposing side legs 22 and 24 and their respective corona shields 18 and 20 is substantially identical to that as shown in FIG. 3. As before noted, however, the corona shields 18 and 20 are each electrically connected to the grounded core 12, while the corona shield 32 is not connected from the core 12 and, as a result, remains insulated therefrom and thus is insulated from ground.

As a result of this arrangement, an effective capacitance, represented by capacitor C1 in FIG. 4, is provided between the conducting surfaces of shield 26 and shield 32, and a second capacitance, represented by capacitor C2 in FIG. 4, is formed between the shield 32 and the grounded core 12. As may clearly be seen from FIG. 4, the capacitors C1 and C2 comprise the arms of capacitance voltage divider generally designated 48 connected in the circuit of secondary winding 16, capacitor C1 being in effective connection with the high voltage output lead 50 of secondary winding 16, and with one terminal of capacitor C2 at junction point 52. The other terminal of capacitor C2 is connected to ground. Junction 52 is connected to a conventional voltmeter 56 through conductor 58, around which a grounded shielding sleeve 60 is arranged, the sleeve 60 being grounded by conductor 62, which is also connected to the ground terminal of voltmeter 56. The core 12 is effectively connected to ground. Appropriate voltage surge protecting devices, such as 66 and 68, may be connected in the circuit as desired.

Voltage divider 48 thus effectively couples to meter 56 an accurately determined portion of the high voltage alternating signal developed at secondary winding 16, the portion so coupled being substantially equal to the ratio of the impedance of capacitor C2 at 60 c.p.s. to the combined impedances of capacitors C1 and C2 at that frequency. By selecting the dimensions of corona shields 26 and 32 and the distance therebetween, the values of the effective capacitances of capacitors C1 and C2 formed by these shields, and hence the ratio of the output signal applied to meter 56 through capacitive voltage divider 48, can be accurately determined. The secondary voltage is capacitively coupled through capacitor C1, a predetermined portion of this coupled voltage then being coupled effectively to ground through capacitor C2. The shield 32, which in conventional transformer construction is grounded by its electrical connection to the grounded core, is here conductively connected to ground only through the grounded connection of the external voltmeter 56.

It is to be appreciated that the elements of the capacitive voltage divider 48 are formed entirely of structural elements (i.e. the corona shielding) found in conventional high voltage transformers, a slight but significant modification having been made to these elements to produce the desired result of the capacitive voltage divider. The voltage divider provided in this clearly economical and simple manner provides the necessary reduced voltage applied to the external meter, with the requisite accuracy, and does away with the requirement for additional bulky and costly circuit elements which were previously required in the capacitive voltage dividers utilized with the conventional high voltage transformers.

While only a single embodiment of the invention has been described, it will be appreciated that many variations may be made thereto without departing from the scope of the invention.

I claim:

1. A high voltage transformer comprising a core, a primary and secondary winding on said core, a first corona shield on said secondary winding, a second corona shield, and means effective to mount said second corona shield on and to electrically insulate said second corona shield from said core, said second corona shield being spaced from said first corona shield, said second corona shield defining with said first corona shield a first capacitance and with said core a second capacitance, said first and second capacitances each comprising an arm of a capacitive voltage divider in effective circuit connection with said secondary winding and adapted to be electrically connected to an external meter.

2. In combination with the transformer of claim 1, a voltage indicating meter connected to said capacitive voltage divider, said second shield being connected to ground through said meter.

3. The transformer of claim 2, in which said core comprises a closed loop having first and second side portions and first and second transverse portions, said windings and said second shield being on said first and second transverse portions respectively.

4. In the transformer of claim 3, third and fourth corona shields on said first and second side portions respectively.

5. The transformer of claim 4, in which said third and fourth corona shields are electrically connected to said core.

6. The transformer of claim 1, in which said core comprises a closed loop having first and second side portions and first and second transverse portions, said windings and said second shield being on said first and second transverse portions respectively.

7. In the transformer of claim 6, third and fourth corona shields on said first and second side portions respectively.

8. The transformer of claim 7, in which said third and fourth corona shields are electrically connected to said core.

9. A measuring system for providing an indication of the output signal developed by a high voltage transformer, said transformer comprising a core, a winding assembly comprising primary and secondary windings arranged in inductive relation on said core, a first corona shield on said winding assembly, and a second corona shield, means effective to mount said second corona shield on said core and effective to insulate said second corona shield from said core, said second corona shield being spaced from said first shield, said second corona shield defining with said first corona shield a first capacitance, a second capacitance being defined between said second corona shield and ground, said first and second capacitances respectively defining the arms of a capacitive voltage divider, a voltage indicating meter, and means connecting said meter between said second corona shield and ground, thereby to effectively couple an accurately determined portion of the signal at said secondary winding to said meter so as to provide said indication.

10. The measuring system of claim 9, in which said core comprises a closed loop having first and second side portions and first and second transverse portions, said windings and said second shield being on said first and second transverse portions respectively.

11. In the transformer of claim 10, third and fourth corona shields on said first and second side portions respectively.

12. The transformer of claim 11, in which said third and fourth corona shields are electrically connected to said core.

References Cited

UNITED STATES PATENTS

| | | | |
|---|---|---|---|
| 1,853,764 | 4/1932 | Fischer | 317—157.62 X |
| 2,331,106 | 10/1943 | Camilli | 324—127 |
| 3,333,220 | 7/1967 | Fischer et al. | 336—84 |

ALFRED E. SMITH, Primary Examiner

U.S. Cl. X.R.

336—84